(12) United States Patent
Stagg et al.

(10) Patent No.: US 9,151,460 B2
(45) Date of Patent: Oct. 6, 2015

(54) LIGHT ASSEMBLY

(75) Inventors: Timothy V. Stagg, Hudson, WI (US);
David A. Ender, New Richmond, WI (US); Mark E. Napierala, St. Paul, MN (US); Barry S. Carpenter, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 694 days.

(21) Appl. No.: 13/384,939

(22) PCT Filed: Jul. 20, 2010

(86) PCT No.: PCT/US2010/042548
§ 371 (c)(1),
(2), (4) Date: Jan. 19, 2012

(87) PCT Pub. No.: WO2011/011377
PCT Pub. Date: Jan. 27, 2011

(65) Prior Publication Data
US 2012/0120672 A1 May 17, 2012

Related U.S. Application Data

(60) Provisional application No. 61/227,304, filed on Jul. 21, 2009.

(51) Int. Cl.
*B60Q 1/34* (2006.01)
*F21S 8/10* (2006.01)
*B60Q 1/26* (2006.01)
*F21Y 101/02* (2006.01)

(52) U.S. Cl.
CPC ............. *F21S 48/215* (2013.01); *B60Q 1/2607* (2013.01); *B60Q 1/2696* (2013.01); *F21S 48/2218* (2013.01); *F21Y 2101/02* (2013.01)

(58) Field of Classification Search
CPC ............ B60Q 1/34; B60Q 1/26; B60Q 1/302; B60Q 1/2607; B60Q 1/30; F21S 48/2281
USPC .................................. 362/231, 230, 540, 541
See application file for complete search history.

(56) References Cited

U.S. PATENT DOCUMENTS

| | | | |
|---|---|---|---|
| 4,588,258 A | 5/1986 | Hoopman | |
| 4,775,219 A | 10/1988 | Appeldorn et al. | |
| 4,851,810 A | 7/1989 | Vitale et al. | |
| 5,122,902 A | 6/1992 | Benson | |
| 5,128,839 A * | 7/1992 | Kato | 362/521 |
| 5,138,488 A | 8/1992 | Szczech | |

(Continued)

FOREIGN PATENT DOCUMENTS

| | | |
|---|---|---|
| EP | 1 253 043 | 10/2002 |
| EP | 1657694 | 5/2006 |

(Continued)

*Primary Examiner* — Julie Bannan
(74) *Attorney, Agent, or Firm* — Robert S. Moshrefzadeh

(57) ABSTRACT

Light assembly having reflector (17), a light source (22), an outer light cover (12) having a first color zone (15) and a second, different color or clear zone (16), and an inner lens (19) with a transflective surface. Embodiments of light assemblies described herein are useful, for example, as signs, backlights, displays, task lighting, luminaire, and vehicle (e.g., cars, trucks, airplanes, etc.) components. Vehicle comprising light assemblies include those where the light assembly is a vehicle tail light assembly.

20 Claims, 4 Drawing Sheets

(56) References Cited

U.S. PATENT DOCUMENTS

| | | |
|---|---|---|
| 5,450,285 A | 9/1995 | Schlemmer |
| 5,455,747 A | 10/1995 | Aoyama |
| 5,840,405 A | 11/1998 | Shusta et al. |
| 6,054,919 A * | 4/2000 | Demko .................. 340/479 |
| 6,273,594 B1 | 8/2001 | Ikeda et al. |
| 6,280,922 B1 | 8/2001 | Lok |
| 6,286,984 B1 | 9/2001 | Berg |
| 6,287,670 B1 | 9/2001 | Benson et al. |
| 6,531,230 B1 | 3/2003 | Weber et al. |
| 6,563,993 B1 | 5/2003 | Imamura et al. |
| 6,752,505 B2 | 6/2004 | Parker et al. |
| 6,771,335 B2 | 8/2004 | Kimura et al. |
| 6,896,397 B2 | 5/2005 | Yamada et al. |
| 6,924,014 B2 | 8/2005 | Ouderkirk et al. |
| 7,714,012 B2 | 5/2010 | Honda et al. |
| 2005/0024754 A1 | 2/2005 | Epstein et al. |
| 2010/0238686 A1 | 9/2010 | Weber et al. |
| 2011/0096529 A1 | 4/2011 | Wheatley et al. |

FOREIGN PATENT DOCUMENTS

| | | |
|---|---|---|
| FR | 2 597 191 | 10/1987 |
| WO | 00/29254 | 5/2000 |

\* cited by examiner

LIGHT ASSEMBLY

CROSS REFERENCE TO RELATED APPLICATIONS

This application is a national stage filing under 35 U.S.C. 371 of PCT/US2011/011377, filed Jul. 20, 2010, which claims priority to Provisional Application No. 61/227,304, filed Jul. 21, 2009, the disclosures of which are incorporated by reference in their entireties herein.

BACKGROUND

Light source applications are well known in the art, and include those that are configured so that light is emitted relatively uniformly over a given area in a given, desired direction. The degree of uniformity and the degree of aiming are dictated by the specific application, but the emitting area is generally comparable to the device that is being illuminated.

Common applications for lighting include backlights for displays and signs as well as vehicular lights. A liquid crystal display (LCD) is commonly used in laptop computers, monitors and televisions. Because a liquid crystal produces no light of its own, but simply modulates light, it is common practice to provide lighting, called a backlight, behind the LCD. This backlight is roughly the same size as the LCD and provides a beam that is directed through the LCD toward the viewer. One type of backlight commonly comprises at least one fluorescent lamp illuminating the edges of a plastic light guide. Light is extracted from the light guide via light extraction features on the surface of the light guide (e.g., bumps, pits, and paint dots).

Illuminated signs, of the type that comprise an internal light source and a translucent outer cover with text and/or graphics formed on it, are another lighting applications. One common internal light source for this application is a row of fluorescent bulbs, with the uniformity requirements being met by placing diffuser plates between the bulbs and the outer cover.

Vehicular lights (e.g., headlights and taillights) are also examples of lighting. For example, SAE J586 July2007, Section 6.4.2, published July, 2007, calls out a minimum lighted area of 50 cm$^2$ for brake lights, and gives details on how this is to be interpreted. In addition, FIGS. 3 to 5 and the associated text in Section 5.1.5 specify the minimum and maximum intensity that needs to be emitted in certain directions.

Several types of suitable light sources are available, and include incandescent bulbs, fluorescent tubes, discharge lamps and light emitting diodes (LEDs). Recent developments in LED technology have made them among the most efficient.

A limitation common to all of the above applications is that they are to some extent limited to flat displays. Automotive lights appear to circumvent this limitation by having a curved outer surface, but they are still limited in the sense that the light is still strongly directed irrespective of the curve. For example, typical taillights comprise an incandescent bulb in a parabolic reflector. This reflector directs the light through the outer cover of the lens with minimal deviation; only scattering due to rough surfaces causes a small amount of light to be distributed over the area of the taillight. More conspicuous is the flatness of signs and LCDs. Both of these could, in some instances, benefit from curvature but they are limited by the available types of lights to substantially flat forms.

In another aspect, it is desirable to have different light sources (e.g., different colors) for various effects (e.g., brake, back up, and running lights in an automobile tail light) in a single optical cavity.

SUMMARY

In one aspect, the present disclosure describes a light assembly comprising
  an outer light cover having a first and second generally opposed major surfaces, and a first zone having a first color, and a second zone having a second, different color (including clear), the second major surface being an inner major surface;
  a reflector having an inner major surface that is parallel to at least 30 (40, 50, 60, 70, 80, or even at least 90) percent of the inner major surface of the outer light cover;
  an inner lens disposed between the outer light cover and the reflector, the inner lens having first and second generally opposed major surfaces, wherein at least one of the first or second major surfaces of the inner lens is transflective, wherein the second major surface of the inner lens is closer to the inner major surface of the reflector than the first major surface of the inner lens; and
  a first light source that emits a first color when energized; wherein there is an optical cavity between inner major surface of the inner lens and the inner major surface of the reflector, and wherein the first light source is selected and positioned to introduce light into the optical cavity such that, when energized, provides the same color for the first and second zones when viewed from the first major surface of the outer cover (as determined by the "Color Test" as described herein). In some embodiments, the outer light cover is curved. Typically, the curved, transflective major surface is generally convex relative to the reflector (e.g., as shown in FIGS. 1, 1A, and 1B). In some embodiments, at least a portion of the reflector is also transflective. In some embodiments, the transflective surface is a film having a transflective surface and/or an embossed surface.

In one exemplary embodiment, the first color of the first zone is red and the first color of the first light source is red. In a further exemplary embodiment, the second color of the second zone is white or clear. In a further exemplary embodiment, the lighting assembly further comprises a second light source that emits a second color (e.g., white) when energized, different than the first color of the first light source (as determined by the "Color Test" as described herein), wherein the second light source is selected and positioned to introduce light into the optical cavity such that, when energized, provides the same color for the first zone, and optionally, provides the second color for the second zone, when viewed from the first major surface of the outer cover (as determined by the "Color Test" as described herein). In a further exemplary embodiment, the lighting assembly further comprises a third light source that emits a color that is the same as the first light source when energized (as determined by the "Color Test"), but brighter, when energized, wherein the third light source is selected and positioned to introduce light into the optical cavity such that, when energized, provides a light intensity brighter than the intensity of the first light source when viewed from the first major surface of the outer cover. In a further exemplary embodiment, the lighting assembly further comprises a fourth light source that emits a fourth color (e.g., amber) when energized, different than the first color of the first light source (as determined by the "Color Test" as described herein), the second color of the second light source, if present, and the third color of the third light source, if present, wherein the fourth light source is selected and positioned to introduce light into the optical cavity such that, when energized, provides a color different from the first color of first light source (as determined by the "Color Test" as described herein), the second color of second light source, if present, and the third color of the third light source, if present, when viewed from the first major surface of the outer cover. In some embodiments, the first light source, the second light source, the third light source, if present, and fourth light source, if present, are within a single optical cavity. In some embodiments there are no more than two different light source colors within a single light cavity.

The "Color Test" was SAE Standard J578 (June 1995) "Color Specification for Electrical Signal Lighting Devices", the disclosure of which is incorporated herein by reference. Section 3 of this standard sets forth the definitions of various colors via light emission boundaries as per x and y values on a Chromaticity Diagram. Following Section 4.1.2 of this standard, a spectrophotometric method was used with a spectroradiometer (obtained under the trade designation "PR-705 SPECTRASCAN SYSTEM" from Photo Research Inc., Chatsworth, Calif.) having a cosine correcting lens, in combination with a 5-axis gonimetric motion control system (obtained under the trade designation "WESTAR FPM 520" from Westar Display Technologies, Inc., Saint Charles, Mo.).

When multiple light sources are utilized in a single optical cavity, light mixing will occur. The emitted light color of each individual zone can be tailored, for example, by the light source spacing, the light source intensity, the light source color, the outer light cover, and/or the spacing between the reflector and the outer light cover and/or inner lens.

In some embodiments, the reflector is at least partially specularly reflective and/or at least partially semi-specularly reflective. In some embodiments, the inner major surface of the outer light cover is at least partially specularly reflective and/or at least partially semi-specularly reflective.

Optionally, lighting assemblies described herein further comprise a diffuser disposed between the outer curved outer cover and the inner major surface.

"Curved surface" as used herein refers to a surface that departs from planarity by at least 2% (in some embodiments, at least 3%, 4%, or even at least 5%) of the longest dimension of the surface (i.e., the percent ratio of the maximum distance of a tangent plane (as measured by the tangent normal) from any point on the surface to the longest dimension on the surface is at least 2% (in some embodiments, at least 3%, 4%, or even at least 5%)).

In some embodiments of light assemblies described herein, the outer light cover comprises an outer part secured to an (e.g., rigid plastic) inner part, and wherein the inner part includes the transflective surface. In some embodiments, the transflective surface is a film having a transflective surface. In some embodiments, the transflective surface is molded or embossed into inner surface of the outer light cover.

In some embodiments, for light assemblies described herein, the transflective surface includes a first region with a first group of structures and a second region with a second, different group of structures. In some embodiments, for light assemblies described herein, the inner surface of the reflector includes a first region with a first group of structures and a second region with a second, different group of structures.

Embodiments of light assemblies described herein are useful, for example, as signs, backlights, displays, task lighting, luminaire, vehicle (e.g., cars, trucks, airplanes, etc.) components. Vehicle comprising light assemblies include those where the light assembly is a vehicle tail light assembly.

DETAILED DESCRIPTION

Figure 1:
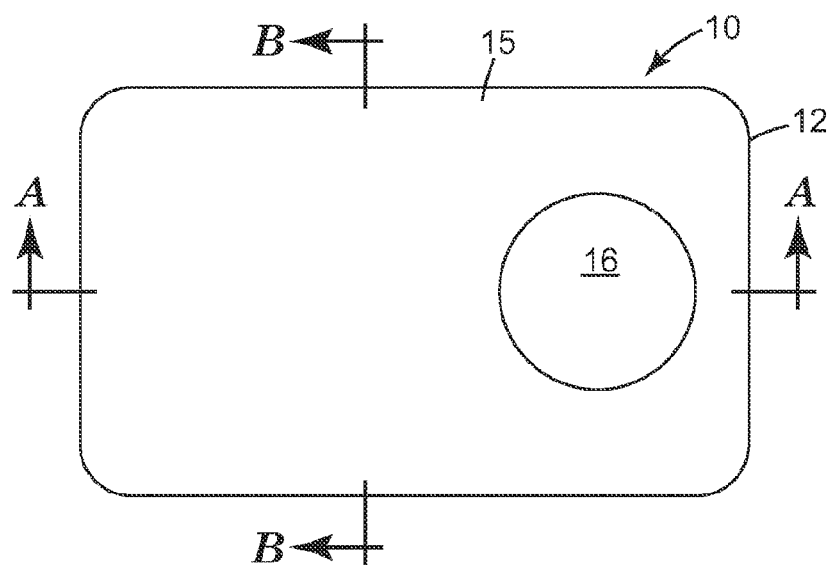
FIGS. 1, 1A (viewed along line AA of FIG. 1), and 1B (viewed along line BB of FIG. 1) are end and cross-sectional side views of an exemplary light assembly of the present disclosure.
Figure 1A:
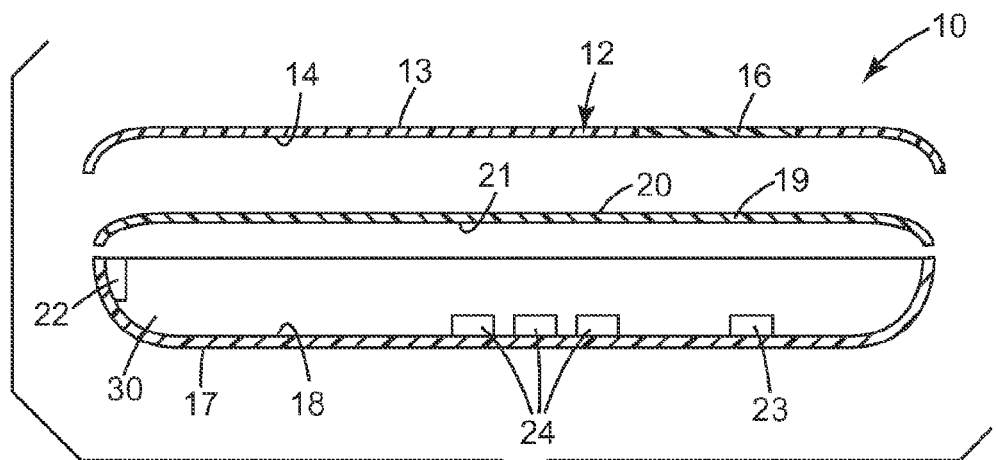
Figure 1B:
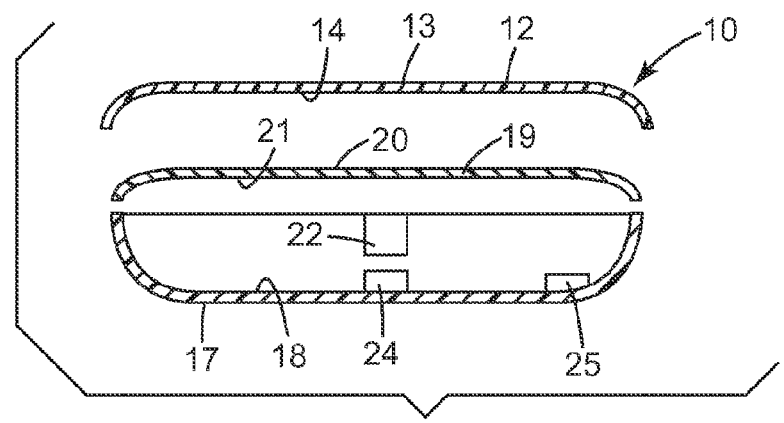

Referring to FIGS. 1, 1A, and 1B, an exemplary light assembly of the present disclosure is shown. Automobile tail light assembly 10 has (optional curved) outer light cover 12 with first and second generally opposed major surfaces 13, 14, and first zone 15 having a first color (e.g., red), and second zone 16 having second, different color (e.g., clear or white). Automobile tail light assembly 10 further includes reflector 17 having inner major surface 18; inner lens 19 disposed between outer light cover 12 and reflector 17, wherein inner lens 19 has first and second generally opposed major surfaces 20, 21, and wherein at least one of first or second major surfaces 20, 21 is transflective; and first light source 22 that emits a first color (e.g., red) when energized. There is an optical cavity 30 between inner lens major surface 21 and reflector major surface 18. First light source 22 (e.g., red; e.g., for running light and/or parking light function) is selected and positioned to introduce light into optical cavity 30 such that, when energized, provides the same color for first and second zones 15, 16 when viewed from first major surface 13. In some embodiments, the outer light cover is curved. Optionally, light assembly 10 includes second light source 23 that emits second color (e.g., white; e.g., for backup function) when energized, different than the first color of first light source 22, wherein second light source 23 is selected and positioned to introduce light into optical cavity 30 such that, when energized, provides the same color for second zone 16 when viewed from first major surface 13. Optionally, light assembly 10 includes third light source 24 that emits a color the same as first light source when energized, but brighter, when energized, wherein third light source 24 is selected and positioned to introduce light into the optical cavity such that, when energized, provides a light intensity brighter than the intensity of the first light source when viewed from first major surface 13 of outer cover 12. Optionally, light assembly 10 includes fourth light source 25 that emits a fourth color (e.g., amber; e.g., for turn signal function) when energized, different than the first color of first light source 22, second color of second light source 23, if present, and the third color of third light source 24, if present, wherein fourth light source 25 is selected and positioned to introduce light into the optical cavity such that, when energized, provides a color different from the first color of first light source 22, second color of second light source 23, if present, and the third color of third light source, if present, when viewed from the first major surface of the outer cover.

Figure 2:
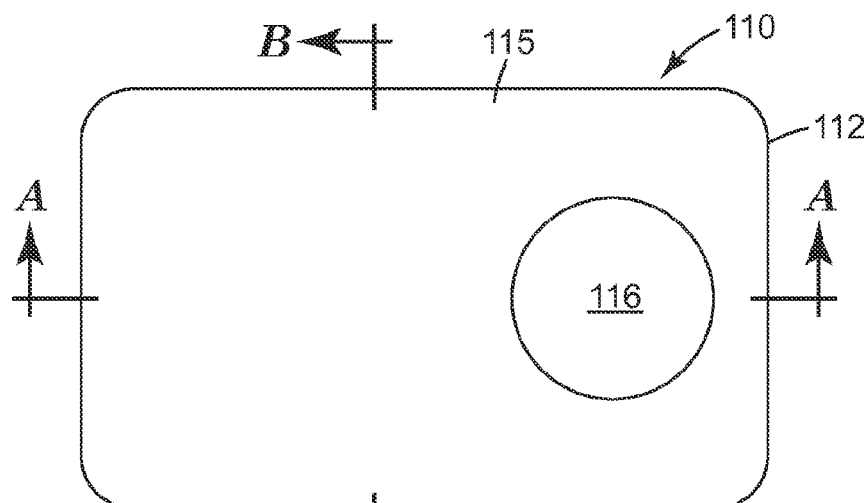
FIGS. 2, 2A (viewed along line AA of FIG. 3), and 2B (viewed along line BB of FIG. 2) are end and cross-sectional side views of an another exemplary light assembly of the present disclosure.
Figure 2A:
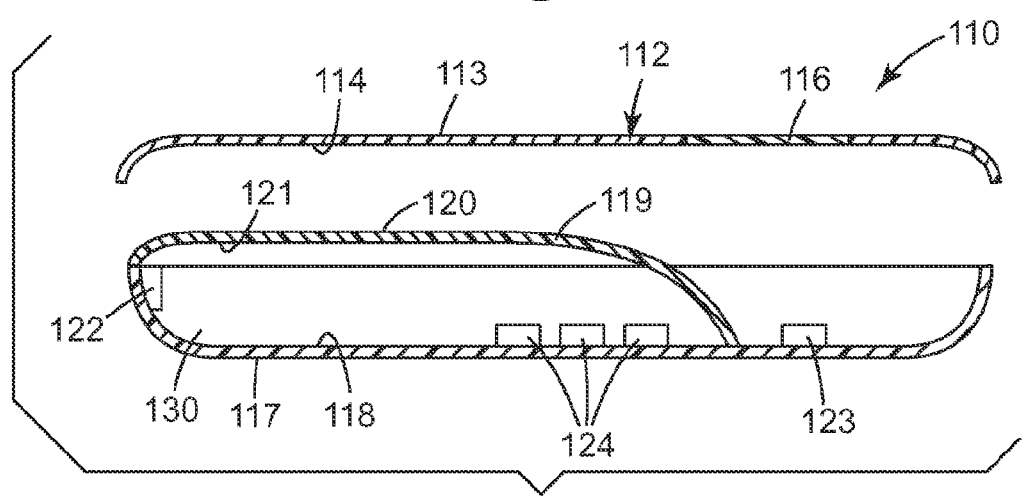
Figure 2B:
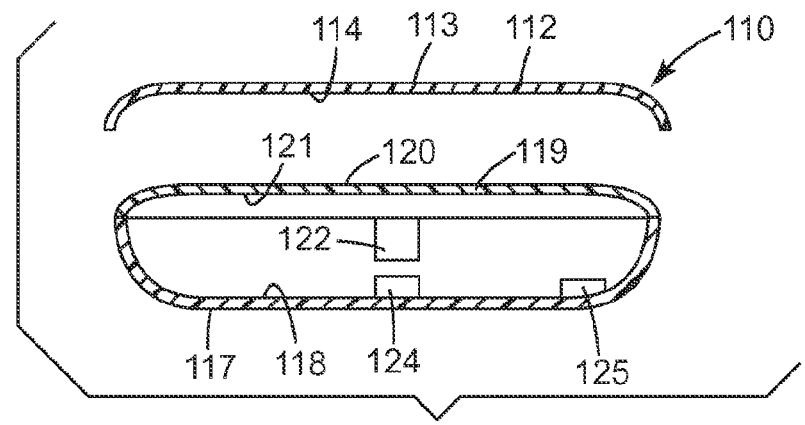

Referring to FIGS. 2, 2A, and 2B, an exemplary light assembly of the present disclosure is shown. Automobile tail light assembly 110 has (optional curved) outer light cover 112 with first and second generally opposed major surfaces 113, 114, and first zone 115 having a first color (e.g., red), and second zone 116 having second, different color (e.g., clear or white). Automobile tail light assembly 110 further includes reflector 117 having inner major surface 118; inner lens 119 disposed between outer light cover 112 and reflector 117, wherein inner lens 119 has first and second generally opposed major surfaces 120, 121, and wherein at least one of first or second major surfaces 120, 121 is transflective; and first light source 122 that emits a first color (e.g., red) when energized. There is an optical cavity 130 between inner lens major surface 121 and reflector major surface 118. First light source 122 (e.g., red; e.g., for running light and/or parking light function) is selected and positioned to introduce light into optical cavity 130 such that, when energized, provides the same color for first and second zones 115, 116 when viewed from first major surface 113. In some embodiments, the outer light cover is curved. Optionally, light assembly 110 includes second light source 123 that emits second color (e.g., white; e.g., for backup function) when energized, different than the first color of first light source 122, wherein second light source 123 is selected and positioned to introduce light into optical cavity 130 such that, when energized, provides the same color for second zone 116 when viewed from first major surface 113. Optionally, light assembly 110 includes third light source 124 that emits a color the same as first light source when energized, but brighter, when energized, wherein third light source 124 is selected and positioned to introduce light into the optical cavity such that, when energized, provides a light intensity brighter than the intensity of the first light source when viewed from first major surface 113 of outer cover 112. Optionally, light assembly 110 includes fourth light source 125 that emits a fourth color (e.g., amber; e.g., for turn signal function) when energized, different than the first color of first light source 122, second color of second light source 123, if present, and the third color of third light source 124, if present, wherein fourth light source 125 is selected and positioned to introduce light into the optical cavity such that, when energized, provides a color different from the first color of first light source 122, second color of second light source 123, if present, and the third color of third light source, if present, when viewed from the first major surface of the outer cover.

The length to depth ratio of the light assembly is understood to be calculated from the length and depth of the light assembly. Length is determined by measuring the longest dimension of the outer cover. For instance, in FIGS. 1, 1A, and 1B, the longest dimension is found by measuring from one end of the outer cover around the bends to the other end. Depth is determined by taking one or more cross-sections of the light assembly and measuring from the inner surface of the outer cover to the closest point on the inner surface of the reflector. The depth is the greatest such measurement.

Outer light covers are known in the art and typically comprise a plastic or other semi-transparent material which can be made, for example, by injection molding, thermoforming, etc., wherein semi-transparent means a majority of the light of the desired wavelengths is transmitted. For example, in a vehicular taillight a red plastic such as polymethylmethacrylate or polycarbonate is used to transmit the wavelengths specified by SAE J578 for such applications.

Particular applications may lend themselves to desired thicknesses and or shapes of the outer cover. Typically, the thickness of the rigid outer cover is in a range from about 0.5 mm to about 10 mm, although other thickness may also be useful. The shape of the outer cover may be in any of a variety of shapes, including those known in the art. The shape of the outer cover is typically chosen for aesthetic or functional reasons.

"Transflective" as used herein means partly reflecting and partly transmitting, although there may also be some absorption (i.e., less than 5% at the operating wavelength of the light assembly). The operating wavelengths are those at which the device is designed to operate. For example, a tail light is designed to be red, so its operating wavelengths are generally greater than 610 nm. Absorption at shorter wavelengths is not within the operating spectrum. Another example would be a sign with a multicolored image on it. Such a sign would generally need to be illuminated with white light so that all of the colors in the image would be illuminated, so absorption should be less than 5% across the visible spectrum. It is understood that in some embodiments a dye or other light absorber may be added to a transflective component that increases its absorption to greater than 5% to produce (e.g., a particular color or degree of transmittance), although the transflective function remains.

Additionally, it is recognized that all transparent materials reflect some light, as given by the Fresnel equations, so transflective is further understood to have reflectivity greater than that dictated by the Fresnel equations at normal incidence, which is given by $$R = \frac{(n-1)^2}{(n+1)^2},$$

where R is the reflectance at normal incidence and n is the refractive index of the material.

Typically, transflective surfaces are smooth partial reflectors or structured surfaces. However, in some embodiments, the inner transflective surface may have a textured surface(s), or at least a portion may have textured surface(s). The texturing may be random, or have a regular symmetric orientation. Typically, the texturing facilitates homogeneous, uniform lighting or otherwise provides light dispersion effect(s). Transflective surfaces can be provided, for example, as separate piece (e.g., a piece of plastic or the like) or a film. The transflective surfaces can also be provided, for example, by any of a number of techniques, including molding, sand blasting, bead blasting, chemical etching, embossing, and laser ablating, as well as other forming techniques that may be apparent to one skilled in the art after reading the instant disclosure.

Smooth partial reflectors are a type of transflective surface that gain their functionality by modifying the reflective properties of a surface without substantially changing the local geometry. For example, a surface is obtained by sputtering a small amount of metal (e.g., aluminum) onto a surface. As the thickness of the metal layer increases, the reflectivity changes from that calculated by the Fresnel equations up toward the theoretical maximum reflectance of the metal. Between these extremes lies the region of partial reflection.

Examples of smooth partial reflectors include metal/dielectric stacks such as silver (available, for example, from Alanod Westlake Metal Ind., North Ridgeville, Ohio, under the trade designation "MIRO-SILVER") and indium tin oxide (available, for example, from Techplast Coated Products, Inc., Baldwin, N.Y.), polarizing and non-polarizing multilayer optical films (available, for example, from 3M Company, St. Paul, Minn., under the trade designation "VIKUITI DUAL BRIGHTNESS ENHANCEMENT FILM"), polarizing and non-polarizing polymer blends (available, for example, from 3M Company under the trade designation "VIKUITI DIFFUSE REFLECTIVE POLARIZER FILM"), wire grid polarizers (available, for example, from Moxtek, Inc., Orem, Utah), and asymmetric optical films (see, e.g., U.S. Pat. No. 6,924,014 (Ouderkirk et al.) and U.S. Patent Application having Ser. No. 60/939,084, filed May 20, 2007, and PCT Patent Application No. US2008/064133, the disclosures of which are incorporated herein by reference). Also useful as partial reflectors are perforated partial reflectors or mirrors (e.g., perforating specularly reflective films having an on-axis average reflectivity of at least 98% of any polarization such as described above (e.g., that marketed by 3M Company under the trade designation "VIKUITI ENHANCED SPECULAR REFLECTOR FILM"). Partial reflectors may also be, for example, mirrors or partial mirrors having a pattern of light scattering areas printed thereon. Crossed polarizers can be used as partial reflectors; the angle of crossing can be used to adjust the ratio of transmission to reflection. Also, foams, voided structures, or polymers filled with inorganic particulates such as titanium dioxide ($TiO_2$) can be used.

Optionally, light extraction features can be present on the back reflector so as to preferentially extract light from the hollow cavity over certain regions to redirect some of this guided light out of the light guide toward the output area of the backlight. Features can be uniformly spaced or non-uniformly spaced. For example, the inner surface of the reflector includes a first region with a first group of light extraction features and a second region with a second, different group of light extraction features. Optionally, the inner surface of the reflector includes a repeating pattern of light extraction features.

Gradient extraction can be accomplished by any element that increases or decreases locally the amount of light extraction. Since the inner reflector generally has some degree of angularly selective transmission, an extraction element that deviates additional light into the angular range of higher transmission will increase the brightness in that region. The extraction zone is generally toward normal, but can be designed to be at oblique angles. The material that is used for the extraction element can be specular, semispecular or diffuse, translucent, transflective, refractive, diffractive. Refractive elements can be prisms, lenslets, lenticulars, and the like. Extraction elements may be applied by printing, casting, etching, transfer (for example adhesive backed dots), lamination, etc. Extraction elements can be made by local deviations in a reflective surface such as embossing, peening, corrugating, abrading, or etching.

Achieving a desired gradient can be accomplished, for example, by changing the light re-directing properties of a diffusing coating locally or gradually across the surface area. This could be accomplished with, for example, a change in thickness, composition, or surface properties. Perforations would be another option, for example, a diffusing film having a gradient of perforations placed over the back reflector.

The gradient can be smoothly varying in a monotonic fashion. It can be abrupt such as in the case of one circular patch of diffuse reflector on a specular backplane to make a bright center.

In some embodiments of lighting assemblies described herein, the inner surface of the reflector includes a first region with a first group of light extraction features, and wherein the first light source is at least partially disposed within the first group of light extraction features.

Structured transflective surfaces have a plurality of minute structures arranged to reflect a substantial portion of the incident light and transmit a substantial portion. The reflectivity of the surface is changed primarily by this change in the local geometry. Useful structures include linear prisms, pyramidal prisms with triangular, square, hexagonal or other polygonal bases, cones, and ellipsoids, which structures may be in the form of projections extending out from a surface or pits extending into the surface. The size, shape, geometry, orientation, and spacing of the structures, as well as the use of multiple, different structures (e.g., different sizes, shapes, geometries, orientations, etc.), and density of spacing can all selected to optimize the performance of the light assembly or otherwise provide a desired effect. The individual structures can be symmetric and/or asymmetric. The structured surface can be uniform and/or non-uniform, and in the latter case both the position and size of the structures can be random or pseudo-random. In this context, "uniform" is understood to mean that the structured surface includes a repeating structural pattern. Disrupting regular features by periodic or pseudo-random variation of size, shape, geometry, orientation, and/or spacing may be used to adjust the color and/or brightness uniformity of the light assembly. In some cases it may be beneficial to have a distribution of small and large structures and position the transflective surface such that the smaller structures are aligned generally over the light sources and the larger structures are positioned elsewhere. In some embodiments, the structures can be closely packed such that there is minimal land (including arrangements in which there is substantially no land) between structures. In some embodiments, it may be desirable to control the land area to modulate the amount of light passing through the transflective surface.

The height to base length ratio of the structures is of some importance to the performance of the light assembly. A structure's base is the surface that would exist if none of the added shapes were present, and its base length is the greatest dimension from any point on the perimeter of the base to any other. Height is understood to mean the distance from the base of the structure to the point most distant from the base.

In a preferred embodiment, the structures are about 0.25 mm high, and about 30% of the transflective area is flat.

Typically, the structures range in height from about from 0.01 mm to 3 mm (in some embodiments, about 0.05 mm to about 0.5 mm), although other sizes are also useful.

In some embodiments, the transflective surface has a structure comprised of a plurality of shapes having a height to base length ratio greater than 0.6:1, 0.75:1, 0.8:1, 0.9:1, or even 1:1.

Examples of suitable structured transflective surfaces include commercial one-dimensional (linear) prismatic polymeric films such as available from 3M Company, St. Paul, Minn., under the trade designations "VIKUITI BRIGHTNESS ENHANCEMENT FILM," "VIKUITI TRANSMISSIVE RIGHT ANGLE FILM," VIKUITI IMAGE DIRECTING FILM," and "VIKUITI OPTICAL LIGHTING FILM," well as conventional lenticular linear lens arrays. When these one-dimensional prismatic films are used as transflective surfaces in a light assembly described herein, it is typically desirable for the prismatic structured surface to face the light source.

Additional examples of suitable structured transflective surfaces, where the structured surface has a two-dimensional character, include cube corner surface configurations such as those reported in U.S. Pat. No. 4,588,258 (Hoopman), U.S. Pat. No. 4,775,219 (Appeldom et al.), U.S. Pat. No. 5,138,488 (Szczech), U.S. Pat. No. 5,122,902 (Benson), U.S. Pat. No. 5,450,285 (Smith et al.), and U.S. Pat. No. 5,840,405 (Shusta et al.); inverted prism surface configurations such as reported in U.S. Pat. No. 6,287,670 (Benson et al.) and U.S. Pat. No. 6,280,822 (Smith et al.); structured surface films such as reported in U.S. Pat. No. 6,752,505 (Parker et al.) and U.S. Patent Publication No. 2005/0024754 (Epstein et al.); and beaded sheeting such as that reported in U.S. Pat. No. 6,771,335 (Kimura et al.), the disclosures of which are incorporated herein by reference.

In some embodiments of light assemblies described herein, at least 50, 55, 60, 65, 70, 75, 80, 85, 90, 95, 99, or even 100 percent by area of the inner major surface of the reflector is transflective. The non-tranflective area may be reflective or absorptive, for example, for aesthetic, cosmetic, or functional reasons.

Figure 3:
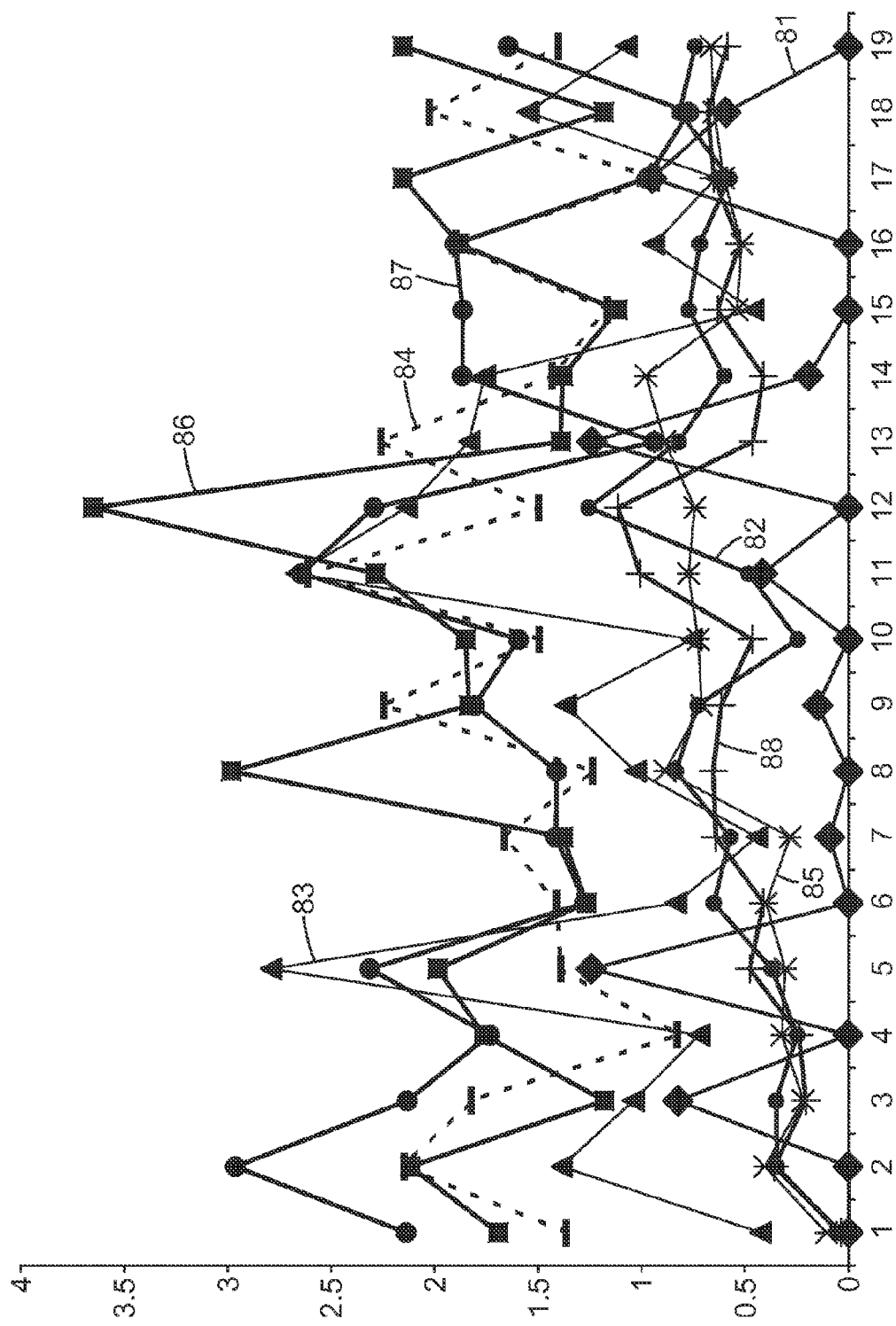
FIG. 3 is a plot of the calculated intensity at the 19 points specified by SAE J585 for several different structure shapes of an exemplary transflective surface.

FIG. 3 shows several traces representing different geometries of structure shapes. It is a plot of the calculated intensity at each of the points mentioned in the SAE J585 standard. The correlation between the number of the point and the angular specification in the standard is given in Table 1, below

TABLE 1

| Point # | H | V |
|---|---|---|
| 1 | 0 | 0 |
| 2 | −5 | 0 |
| 3 | 5 | 0 |
| 4 | 0 | −5 |
| 5 | 0 | 5 |
| 6 | −10 | 0 |
| 7 | −10 | −5 |
| 8 | −10 | 5 |
| 9 | 10 | 0 |
| 10 | 10 | −5 |
| 11 | 10 | 5 |
| 12 | −5 | −10 |
| 13 | −20 | −5 |
| 14 | −20 | 5 |
| 15 | −5 | 10 |
| 16 | 5 | −10 |
| 17 | 20 | −5 |
| 18 | 20 | 5 |
| 19 | 5 | 10 |

The traces in the plot of FIG. 3 correspond to the following structures: FullCC20k 81 is a close-packed array of corner cubes; HexPyrh1 82 is a pyramid with a hexagonal base and a height to base length ratio of 0.5:1; HexPyrh2 83 is a pyramid with a hexagonal base and a height to base length ratio of 1:1; HexPyrh3 84 is a pyramid with a hexagonal base and a height to base length ratio of 1.5:1; Cone2h1 86 is a right circular cone with a height to base length ratio of 0.5:1; Cone2h2 86 is a right circular cone with a height to base length ratio of 1:1; Pyr2h1 88 is a pyramid with a square base and a height to base length ratio of 0.5:1; and Pyr2h2 87 is a pyramid with a square base and a height to base length ratio of 1:1.

The ordinate (y-value) of the plot shows the calculated intensity at each point as a fraction of the intensity of the light assembly with no structure. Although such a construction would not be practical, in the sense that it would not provide a uniform lit appearance, it does serve as a reasonable basis for comparison. All values that fall below one represent a decrease in intensity versus the basis, while values greater than one represent an intensity greater than the bases.

Although there is statistical "noise" in the data due to insufficient sampling, it is clear that the cube corners and the other structures with an aspect ratio of 0.5:1 are inferior to the basis in terms of intensity. Because the inner lens is preferably constructed of a material that absorbs little light at the design wavelengths (though it may absorb at other wavelengths), the reduced intensity means that the light is being directed away from the detector positions specified by the standard. Two possibilities for this redirection are that the light is reflected back into the optical cavity (the volume between the transflective surface and the reflector) or the light is transmitted by the transflective surface into directions other than toward the specified detector positions. Both possibilities will, in general, be realized, with the ratio between reflection and transmission being determined by the exact shape of the structure. For some applications, this redirection may be desirable, such as for widening the angular range over which the light is easily visible, while for other applications, it may be undesirable. Vehicular lighting places an emphasis on the intensity of light directed toward the locations of the specified detectors, so height to base length ratios of greater than 0.6 are preferred.

At the other end of the range of height to base length range, the intensity at the specified detector positions by HexPyrh3 84, with a height to base length ratio of 1.5:1 is not substantially greater than that produced by any of the shapes with an aspect ratio of 1:1. However, for most points, it does still exceed the basis for comparison, so it is within the preferred range of height to base length ratios. Increasing the height to base length ratio beyond some point (e.g., 3:1), results in increasing difficulty of manufacture, so ratios beyond this may be impractical.

Figure 4:
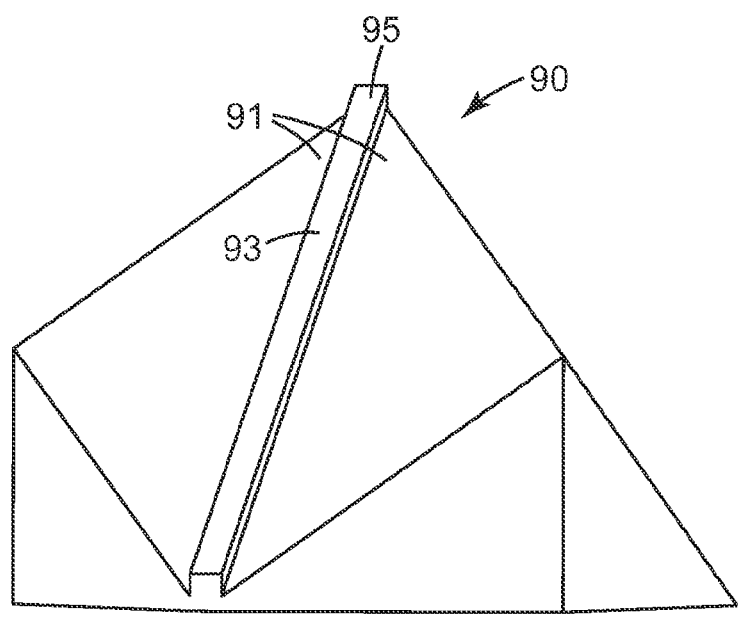
FIG. 4 is a perspective view of an exemplary structure in an exemplary transflective surface.

Another aspect of the structures relating to manufacturing is the possible inclusion of a (raised) rib from the base to the apex (see, e.g., FIG. 4, showing structure 90 having face 91 and (raised) rib 93 and apex 95), or point farthest from the base. This (raised) rib may be of any shape, but should affect only a small fraction of the surface of the shape, for example, up to 10% of the area (in some embodiments, up to 5%). The function of the (raised) rib is to avoid air entrapment in the molding process and to facilitate separation of the part from the mold.

In some embodiments, the transflective surface is at least partially (e.g., at least 10%, 15%, 20%, 25%, 30%, 35%, 40%, 45%, 50%, 55%, 60%, 65%, 70%, 75%, 80%, 85%, 90%, 95%, 97%, 98%, 99%, or even 100%) reflective. The reflectance may be semi-specular. A "semi-specular" reflector provides a balance of specular and diffusive properties. Semi-specular reflective surfaces can be provided, for example, by (1) a partial transmitting specular reflector plus a high reflectance diffuse reflector; (2) a partial Lambertian diffuser covering a high reflectance specular reflector; (3) a forward scattering diffuser plus a high reflectance specular reflector; or (4) a corrugated high reflectance specular reflector. Additional details regarding semi-specular reflective materials, can be found, for example, in PCT Application No. US2008/864115, the disclosure of which is incorporated herein by reference.

In some embodiments, it may be desirable for the transflective surface to also be retroreflective. This is understood to mean that, in addition to transmitting and reflecting light within the optical cavity, the transflective also reflects a substantial portion of light incident on it from outside the outer lens cover back in the general direction of the source of that light. Traditionally, this is done by using cube corners (tetrahedra with three right angles) for the shape of the microstructures. In some embodiments where high retroreflectivity is not desired, reduced retroreflectivity may be achieved by using cube corners with spaces between them, or between groups of them, or by modifying the angles to differ from 90°. Partial retroreflectivity can range from returning 10% of the incident light to, for example, 20%, 30%, 40%, 50%, 60%, 70%, 80%, or even at least 90%. Partial retroreflectivity can also be induced, for example, by physical openings in the retroreflective surface (e.g., holes, slots, perforations, etc.) or by otherwise destroying the retroreflective functionality (e.g., such as by filling the retroreflective structured surface with coatings or adhesive). A spatially variant structure could also be used. "Spatially variant structure" means that the size, spacing, shape or some other parameter of the structures is varied across the surface.

Suitable reflectors are known in the art. The reflective nature of the reflector is, for example, an inherent property of a substrate material (e.g., polished aluminum), a coating on a substrate material (e.g., silver or a multilayer optical coating), or a reflective film attached to the substrate. Typically, it is desirable for the reflector to have a highly reflective surface for enhanced light output efficiency for the light assembly. Typically, the reflectivity of the reflective surface of the reflector for visible light is at least 90% (in some embodiments, at least 91%, 92%, 93%, 94%, 95%, 96%, 97%, 98%, 99%, or more). The reflector can be a predominantly specular, diffuse, or combination specular/diffuse reflector, whether spatially uniform or patterned. In some embodiments, the reflector is at least partially (e.g., at least 10%, 15%, 20%, 25%, 30%, 35%, 40%, 45%, 50%, 55%, 60%, 65%, 70%, 75%, 80%, 85%, 90%, 95%, or even 100%) semi-specularly reflective. In some embodiments, the lighting assembly of any preceding claim, wherein the major surface of the reflector has a spectral reflectance of at least 90, 91, 92, 93, 94, 95, 96, 97, 98, or even at least 98.5) percent.

Suitable reflective films include those available from 3M Company, St. Paul, Minn., under the trade designations "VIKUITI ENHANCED SPECULAR REFLECTOR." Another exemplary reflective film made by laminating a barium sulfate-loaded polyethylene terephthalate film (0.08 mm (2 mils) thick) to a film available from 3M Company under the trade designation "VIKUITI ENHANCED SPECULAR REFLECTOR" using a 0.16 mm (0.4 mil) thick isooctylacrylate acrylic acid pressure sensitive adhesive. Other suitable reflective films include those available from Toray Industries, Inc., Urayasu, Japan, under the trade designation "E-60 SERIES LUMIRROR"; porous polytetrafluoroethylene (PTFE) films from W. L. Gore & Associates, Inc., Newark, Del.; those available from Labsphere, Inc., North Sutton, N.H., under the trade designation "SPECTRALON REFLECTANCE MATERIAL"; those available from Alanod Aluminum-Verdun GmbH & Co., Ennepetal, Germany, under the trade designation "MIRO ANODIZED ALUMINUM FILMS" (including that available under the trade designation "MIRO 2 FILM"); those available from Furukawa Electric Co., Ltd., Tokyo, Japan, under the trade designation "MCPET HIGH REFLECTIVITY FOAMED SHEETING"; and those available from Mitsui Chemicals, Inc., Tokyo, Japan, under the trade designations "WHITE REFSTAR FILMS" and "MT FILMS."

The reflector may be substantially smooth, or it may have a structured surface associated with it to enhance light scattering or mixing. Such a structured surface can be imparted (a) on the reflective surface of the reflector, or (b) on a transparent coating applied to the reflective surface. In the former case, a highly reflecting film may be laminated to a substrate in which a structured surface was previously formed, or a highly reflecting film may be laminated to a flat substrate (e.g., \that available from 3M Company under the trade designation "VIKUITI DURABLE ENHANCED SPECULAR REFLECTOR-METAL (DESR-M) REFLECTOR") followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

The reflector can also be made substantially from reflective films such as that available from 3M Company under the trade designations "VIKUITI ENHANCED SPECULAR REFLECTOR." The latter film is thermoformable and has enhanced UV stability believed to be due to the presence of polymethylmethacrylate skins which encapsulate the multilayer polymer film structure that exhibits high specular reflectivity. This film can be used to thermoform reflector shapes suitable for a light assembly. This polymer film can be used, for example, as an insert in a pre-formed housing or as a stand alone housing component.

Alternatively, for example, the construction can be modified so that one of the skins is made from a different polymer that offers improved mechanical strength as compared to polymethylmethacrylate. For example, polycarbonate or a polymer blend of acrylonitrile butadiene styrene/polycarbonate can be used to form the second skin. The second skin need not to be transparent. This film can then be thermoformed into the desired reflector shape, oriented with the reflective surface facing the interior of the light assembly and the second skin serving as an external surface. This thermoformed part can be used a stand alone housing component.

The reflector can be a continuous unitary (and unbroken) layer on which the light source is mounted, or it can be constructed discontinuously in separate pieces, or discontinuously insofar as it includes isolated apertures, through which the light source can protrude, in an otherwise continuous layer. For example, strips of reflective material can be applied to a substrate on which rows of LED's are mounted, each strip having a width sufficient to extend from one row of LED's to another and having a length dimension sufficient to span between opposed borders of the backlight's output area.

Optionally, the reflector may comprise areas of differing reflectivity. For example, the reflector could have high reflectivity for all wavelengths near the light source, but reflect primarily one color, such as red, green or blue, far from the source (e.g., a multicolored light assembly with only one light source). The transition between the regions of differing reflectivity could also be gradual.

The reflector can also include sides and ends located along the outer boundary of the reflector that are preferably lined or otherwise provided with high reflectivity vertical walls to reduce light loss and improve recycling efficiency. The same reflective material used for the reflective surface can be used to form these walls, or a different reflective material can be used. In exemplary embodiments, the side walls are specularly reflective.

In some embodiments, the inner major surface of the reflector is parallel to at least 40, 45, 50, 55, 60, 65, 70, 75, 80, 85 or even at least 90 percent of the inner major surface of the curved outer light cover.

In some embodiments, it may be desirable for light to be transmitted from both sides of the light assembly. For example, at least a portion (e.g., at least 1%, 2%, 5%, 10%, 20%, 50%, 75%, or even at least 90%) of the reflector can comprise a transflective surface as described above.

Exemplary light sources include light sources known in that art such as incandescent lights, light emitting diodes ("LEDs"), and arc lamps. They may have any desired output pattern, and may emit a desired color or act as a broadband source which is later filtered. Light assemblies described herein may have 1 or more (e.g., 2, 3, 4, 5, 6, 7, 8, 9, or more) light sources (e.g., 1, 2, 3, 4, 5, etc. incandescent lights, halogen lights, and or LEDs, etc.).

The light source(s) can be position to introduce through a hole or window in the reflector wall, be within, or partially within the optical cavity, including any side wall(s).

In some embodiments, the LED may be used with a wedge-shaped reflector so that light may be emitted into the enclosure with a restricted or partially collimated angular distribution. Further, in some embodiments, light sources that at least partially collimate the emitted light may be preferred. Such light sources can include lenses, extractors, shaped encapsulants, or combinations thereof of optical elements to provide a desired output into the enclosure. Further, the lighting output sources can include injection optics that partially collimate or confine light initially injected into the enclosure to propagate in directions close to a transverse plane (the transverse plane being parallel to the output area of the lighting output source) (e.g., an injection beam having an average deviation angle from the transverse plane in a range from 0° to 45°, or 0° to 30°, or even 0° to 15°).

Optionally, the light source includes a light guide (e.g., light fiber) at least partial within the cavity, the light fiber comprising a core and a clad having a refractive index lower than that of the core on the periphery of the core, wherein the light fiber has a light diffusive and reflective portion formed by co-extrusion at least on the inner periphery of the clad. Optionally, the diffusive and reflective portion comes into contact with the core. Optionally the light diffusive and reflective portion has a thickness extending at least to the vicinity of outer periphery of the clad in a direction perpendicular to the longitudinal direction from the clad. Optionally, the light diffusive and reflective portion is formed in a predetermined thickness extending from the inner periphery surface of the clad to the core portion in a direction perpendicular to the longitudinal direction of the clad. Optionally, the light diffusive and reflective portion extends into within the core. Optionally, the diffusive and reflective portion is formed a linear shape or a band-like shape along the longitudinal direction of the clad.

Optionally, the light fiber can be of a single material (light guide) and can incorporate light extraction structures (optical elements) that extract the light. In order to maintain a substantially uniform output illumination along the light emitting region of the fiber, the morphology, pattern and spacing of successive optical elements may be controlled so as to compensate for the light reflected out of the fiber by preceding elements. For example, the cross-sectional area of the reflecting surface(s) of successive optical elements may be increased in the direction of intended light travel. Alternatively, the spacing between successive optical elements may be decreased or the angle of the reflecting surface(s) changed, or a combination of any or all of these methods may be used.

In order to provide more light in broader angles one can incorporate more than one row (axis) of optical elements. It will be apparent to one of ordinary skill in the art that the minimum angular displacement δ is slightly greater than 0°, in which case the axes are nearly coincident, and the maximum angular displacement δ is 180°. In practice, the displacement δ between first longitudinal axis and second longitudinal axis is governed primarily by functional considerations. More particularly, the angular displacement δ is determined by the desired angular spread of the divergence cone of reflected light in the lateral (e.g., cross-fiber) dimension and may be determined using optical modeling techniques known to one of ordinary skill in the art. For many applications where the optical fiber is used to illuminate a broad area, angular displacements of up to 100° are useful to spread the emerging light into a broad angular distribution.

By contrast, in applications where the optical fiber is viewed directly such as, for example, a vehicle warning light, it may be desirable to narrow the lateral dimension of the angular distribution of emerging light to concentrate the light within a desired angular range. For such applications, angular displacements δ between about 5° and 20° are useful.

Another benefit associated with disposing optical elements about distinct longitudinal axes extending along the surface of an optical fiber relates to shadowing effects in the fiber. Shadowing effects are discussed at length below. In brief, each optical element in an optical fiber shadows the adjacent optical element from a portion of the light rays propagating through an optical fiber. The degree of shadowing is proportional to the depth to which the optical element extends into the optic al fiber. Providing optical elements disposed about two distinct longitudinal axes on the surface of an optical fiber reduces detrimental effects associated with shadowing by allowing light to be spread into a broader divergence cone without resorting to deeper optical elements as required in single axis embodiments. Additionally, because the optical elements are displaced from one another, shadowing effects are spread more evenly around the perimeter of the optical fiber, making their effects less noticeable.

In some embodiments, it is desired to produce an illumination pattern in the x-z plane that is relatively narrowly confined in the vertical (y) direction but which provides roughly uniform intensity in the horizontal (x) direction. For example, it may be desirable for the intensity of the light in the horizontal direction to be roughly uniform over +/−45 degrees. An illumination device having a series of uniformly configured light extraction structures (optical elements) will not yield such an intensity pattern. However, a variety of different intensity patterns may be produced by providing a series of light extraction structures that have different configurations. For example, by providing a plurality of light extraction structures having several different notch angles the intensity pattern can be tailored for a given application. That is, the notch angle can become an adjustable parameter that can be varied to produce desired illumination patterns. For additional details on light fibers, see U.S. Pat. No. 6,563,993 (Imamura et al.).

In some embodiments, the light source(s) is placed through holes in the reflector. For example, they may be placed through the portion of the reflector which is parallel to the inner surface of the outer cover, through the sides or ends of the through the portion of the reflector where the separation between the reflector and the outer light cover is decreasing.

In some embodiments, at least 10% (in some embodiments, at least 15%, 20%, 25%, 30%, 35%, 40%, 45%, 50%, 55%, 60%, 65%, 70%, 75%, 80%, 85%, or even at least 90%) of the outer major surface of the curved outer light cover is retroreflective.

Suitable light emitting diodes are known in the art, and commercially available, including LEDS having a light extraction cone in a range from 20° to 30° and LEDs having Lambertian light emission pattern. LEDs are available in a variety of power usage ratings, including those ranging from less than 0.1 to 10 watts (e.g., power usage ratings up to 0.1, 0.25, 0.5, 0.75, 1, 2.5, 5, or even up to 10 watts) per LED. LEDs are available, for example, in colors ranging range from ultraviolet (less than about 400 nm) to infrared (beyond 700 nm). Basic colors of LEDs are blue, green, red and amber, although other colors, as well, as white, are obtainable by mixing the basic colors or adding phosphors.

In some embodiments, and typically desirably, the light emitting diodes, when energized have a uniform luminous exitance. Luminous exitance refers to the amount of light emitted, in lumens, per unit area. The degree of required uniformity varies with the application. LCD's generally require uniformity to be greater than 80%, as specified in VESA-2001-6. Other applications, such as signs and vehicle lights do not have as clear a definition of uniformity, but the total change from the brightest point to the dimmest should not be noticeable, nor should there be any localized gradients in luminous exitance so great as to be obvious. In some embodiments, light assemblies described herein have up to 5 light emitting diodes per 100 cm$^2$.

In some embodiments, lighting assemblies described herein have a total power usage of up to 15 watts, 10 watts, or even up to 5 watts.

In some embodiments, light assemblies described herein have a length to depth ratio greater than 2:1, 3:1, 5:1, 10:1, 15:1, 20:1, 25:1, 50:1, 75:1, or even 80:1.

In some embodiments (e.g., vehicle components), it is desirable to for the light assembly (e.g., the optical cavity) to be sealed, for example, against dust and/or moisture penetration.

Optionally, lighting assembly described herein further comprising a tinted transmissive element(s) (e.g., a film(s)) (i.e., at least 20% (optionally, at least 25%, 30%, 35%, 40%, 45%, 50%, 55%, 60%, 70%, 75%, 80%, 85%, or even at least 90%) of the photons for at least one wavelength in the of light (e.g., in the visible spectrum) striking the element are transmitted through and exit the element) disposed between the transflective surface and the reflector. The transparent tinted element can be, for example, between inner major surface of the curved outer light and the reflector, between the first light and the inner major surface of the curved outer light, and/or between the first light source and the reflector. In some embodiments, a transparent tinted element can be positioned in the optical cavity and/or between the inner lens and the outer cover to provide a first zone of a first color, and a second zone of a second, different color.

One or more colors of transparent tined elements may be used. Suitable films are known in the art and include tinted (e.g., dyed or pigmented) films and color shifting films. Transmissive tinted and color shifting films are available, for example, from 3M Company under the trade designation "SCOTCHCAL 3630" in about 60 different colors.

"Color shifting film" as used herein refers to a film comprising alternating layers of at least a first and second layer type, wherein the first layer type comprises a strain hardening polymer (e.g., a polyester), wherein the film has at least one transmission band and one reflection band in the visible region of the spectrum, the transmission band having an average transmission of at least 70%, and wherein at least one of said transmission band and reflection band varies at normal incidence by less than about 25 nm over a square inch. Optionally, the film comprises alternating polymeric layers of at least a first and a second layer type, wherein the film has at least one transmission band and at least one reflection band in the visible region of the spectrum, and wherein at least one of the transmission band and reflection band has a band edge that varies at normal incidence by no more than 8 nm over a distance of at least 2 inches along each of two orthogonal axes in the plane of the film. Optionally, at least one of the transmission band and the reflection band has a bandwidth at normal incidence that varies by no more than 2 nm over a surface area of at least 10 cm$^2$. Optionally, the film has exactly one transmission band in the visible region of the spectrum. Optionally, the film has exactly one reflection band in the visible region of the spectrum. Color shifting films can be made, for example, as described in U.S. Pat. No. 6,531,230 (Weber et al.), the disclosure of which is incorporate herein by reference; additional details regarding such films can also be found in said patent.

In some embodiments, a semi-specular element can be disposed in the cavity (e.g., between inner major surface of the curved outer light and the reflector, between the first light and the inner major surface of the curved outer light, and/or between the first light source and the reflector (i.e., similar to the transparent tinted element described above).

Optionally, light assemblies described herein can include a light sensor(s) and feedback system to detect and control, for example, brightness and/or color of light from the light source(s). For example, a sensor can be located near the light source(s) to monitor output and provide feedback to control, maintain, and/or adjust brightness and/or color. It may be beneficial, for example, to locate a sensor(s) along an edge and/or within the cavity to sample the mixed light. In some instances it may be beneficial, for example, to provide a sensor(s) to detect ambient light in the viewing environment (e.g., the room that the display is in or for an automotive taillight) whether it is day or night. Control logic can be used, for example, to appropriately adjust the output of the light source(s) based on ambient viewing conditions. Suitable sensor (s) are known in the art (e.g., light-to-frequency or light-to-voltage sensors), and are commercially available, for example, from Texas Advanced Optoelectronic Solutions, Plano, Tex.). Additionally, or alternatively, a thermal sensor(s) may be used to monitor and control the output of the light source(s). These sensor techniques can be used, for example, to adjust light output based on operating conditions and compensation for component aging over time.

Optionally, light assemblies described herein further comprise additional support features (e.g., a rod or the like), including within a portion of the optical cavity.

Embodiments of light assemblies described herein are useful, for example, as signs, backlights, displays, task lighting, luminaire, and vehicle (e.g., cars, trucks, airplanes, etc.) components. Vehicle comprising light assemblies include those where the light assembly is a vehicle tail light assembly.

Optional Embodiments

1. A light assembly comprising
an outer light cover having a first and second generally opposed major surfaces, and a first zone having a first color, and a second zone having a second, at least one of different color or being clear, the second major surface being an inner major surface;
a reflector having an inner major surface that is parallel to at least 30 percent of the inner major surface of the outer light cover;
an inner lens disposed between the outer light cover and the reflector, the inner lens having first and second generally opposed major surfaces, wherein at least one of the first or second major surfaces of the inner lens is transflective, wherein the second major surface of the inner lens is closer to the inner major surface of the reflector than the first major surface of the inner lens; and
a first light source that emits a first color when energized; wherein there is an optical cavity between inner major surface of the inner lens and the inner major surface of the reflector, and wherein the first light source is selected and positioned to introduce light into the optical cavity such that, when energized, provides the same color for the first and second zones when viewed from the first major surface of the outer cover.

2. The lighting assembly of embodiment 1, wherein the outer light cover is curved.

3. The lighting assembly of either embodiment 1 or 2, wherein the first color of the first zone is red, and wherein the first color of the first light source is red.

4. The lighting assembly of any preceding embodiment, further comprising a second light source that emits a second color when energized, different than the first color of the first light source, wherein the second light source is selected and positioned to introduce light into the optical cavity such that, when energized, provides the same color for the first zone when viewed from the first major surface of the outer cover.

5. The lighting assembly of embodiment 4, wherein the second light source is selected and positioned to introduce light into the optical cavity such that, when energized, also provides the second color for the second zone when viewed from the first major surface of the outer cover.

6. The lighting assembly of either embodiment 4 or 5, wherein the first and second light sources are in a single optical cavity.

7. The lighting assembly of any of embodiments 1 to 5, wherein the first and second light sources are not in a single optical cavity.

8. The lighting assembly of any preceding embodiment, wherein the second color of the second zone is white, and wherein the second color of the second light source is white.

9. The lighting assembly of any of embodiments 4 to 8, wherein the second zone is clear, and wherein the second color of the second light source is white.

10. The lighting assembly of any of embodiments 4 to 9, wherein the first and second light source are within a single optical cavity.

11. The lighting assembly of any of embodiments 4 to 10, further comprising a third light source that emits a third color when energized, is the same as the first light source when energized, but brighter, than the first color of the first light source, wherein the third light source is selected and positioned to introduce light into the optical cavity such that, when energized, provides a light intensity brighter than the intensity of the first light source when viewed from the first major surface of the outer cover.

12. The lighting assembly of any of embodiments 4 to 11, further comprising a fourth light source that emits a fourth color when energized, different than both the first color of the first light source and the second color of the second light source, wherein the fourth light source is selected and positioned to introduce light into the optical cavity such that, when energized, provides a color different from the first and second light sources when viewed from the first major surface of the outer cover.

13. The lighting assembly of embodiment 12, wherein the third color of the third zone is amber, and wherein the third color of the third light source is amber.

14. The lighting assembly of any preceding embodiment, wherein the inner surface of the reflector includes a first region with a first group of light extraction features, and wherein the first light source is at least partially disposed within the first group of light extraction features.

15. The lighting assembly of any preceding embodiment, wherein the inner major surface of the curved outer light cover is generally convex relative to the reflector.

16. The lighting assembly of any preceding embodiment, wherein the reflector is at least partially specularly reflective.

17. The lighting assembly of any preceding embodiment, wherein the reflector is at least partially semi-specularly reflective.

18. The lighting assembly of any preceding embodiment, wherein the inner major surface of the outer light cover is at least partially specularly reflective.

19. The lighting assembly of any of embodiments 1 to 18, wherein the inner major surface of the outer light cover is at least partially semi-specularly reflective.

20. The lighting assembly of any preceding embodiment, wherein the inner major surface of the reflector is parallel to at least 40 percent of the inner major surface of the outer light cover.

21. The lighting assembly of any of embodiments 1 to 19, wherein the inner major surface of the reflector is parallel to at least 50 percent of the inner major surface of the outer light cover.

22. The lighting assembly of any of embodiments 1 to 19, wherein the inner major surface of the reflector is parallel to at least 60 percent of the inner major surface of the outer light cover.

23. The lighting assembly of any of embodiments 1 to 19, wherein the inner major surface of the reflector is parallel to at least 70 percent of the inner major surface of the outer light cover.

24. The lighting assembly of any of embodiments 1 to 19, wherein the inner major surface of the reflector is parallel to at least 80 percent of the inner major surface of the outer light cover.

25. The lighting assembly of any preceding embodiment, wherein the major surface of the reflector has a spectral reflectance of at least 90 percent.

26. The lighting assembly of any of embodiments 1 to 24, wherein the major surface of the reflector has a spectral reflectance of at least 98.5 percent.

27. The lighting assembly of any preceding embodiment, further comprising as diffuser disposed between the outer curved outer cover and the inner major surface.

28. The lighting assembly of any preceding embodiment, wherein the transflective surface has a first region with a first group of structures and a second region with a second, different group of structures.

29. The lighting assembly of any preceding embodiment, wherein the transflective surface has a repeating pattern of structures.

30. The light assembly of any preceding embodiment having a length to depth ratio greater than 2:1.

31. The light assembly of any of embodiments 1 to 29 having a length to depth ratio greater than 3:1.

32. The light assembly of any of embodiments 1 to 29 having a length to depth t ratio greater than 5:1.

33. The light assembly of any of embodiments 1 to 29 having a length to depth ratio greater than 10:1.

34. The light assembly of any of embodiments 1 to 29 having a length to depth ratio greater than 25:1.

35. The light assembly of any of embodiments 1 to 29 having a length to depth ratio greater than 50:1.

36. The light assembly of any of embodiments 1 to 29 having a length to depth ratio greater than 75:1.

37. The light assembly of any preceding embodiment, wherein the transflective surface has a structure comprised of a plurality of shapes having a height to base length ratio greater than 0.6:1.

38. The light assembly of any of embodiments 1 to 36, wherein the transflective surface has a structure comprised of a plurality of shapes having a height to base length ratio greater than 0.75:1.

39. The light assembly of any of embodiments 1 to 36, wherein the transflective surface has a structure comprised of a plurality of shapes having a height to base length ratio greater than 0.9:1.

40. The light assembly of any of embodiments 37 to 39, wherein the shape of at least one of the structures has a surface area and on the transflective surface includes a groove from the base to the apex of the structure covering no more than 10% of the surface area of the structure.

41. The light assembly of any of embodiments 37 to 39, wherein the shape of at least one of the structures has a surface area and on the transflective surface includes a groove from the base to the apex of the structure covering no more than 5% of the surface area of the structure.

42. The lighting assembly of any preceding embodiment, wherein the transflective surface is a film having a transflective surface.

43. The lighting assembly of any of embodiments 1 to 41, wherein the transflective surface is molded into inner surface of the outer light cover.

44. The lighting assembly of any of embodiments 1 to 41, wherein the transflective surface is embossed into inner surface of the outer light cover.

45. The lighting assembly of any preceding embodiment, wherein when the light source is energized, the light assembly exhibiting a uniform luminous exitance.

46. The lighting assembly of any preceding embodiment, wherein the first and second light sources are each light emitting diodes.

47. The lighting assembly of embodiment 46, wherein the at least one light emitting diode has a power usage rating in a range from 0.25 watt to 5 watts.

48. The lighting assembly of any embodiments 45 to 47 having two light emitting diodes.

49. The lighting assembly of any preceding embodiment, wherein the first light source includes a light guide positioned at least partially within the optical cavity.

50. The lighting assembly of any preceding embodiment, further comprising a transparent tinted element between inner major surface of the outer light and the reflector.

51. The lighting assembly of any preceding embodiment, further comprising a semi-specular element disposed in the cavity.

52. The lighting assembly of any preceding embodiment, wherein the reflector is also transflective.

53. The lighting assembly of any preceding embodiment, wherein the outer light cover has an outer major surface that is at least 10% retroreflective.

54. The lighting assembly of any of embodiments 1 to 52, wherein the outer light cover has an outer major surface that is at least 25% retroreflective.

55. The lighting assembly of any of embodiments 1 to 52, wherein the curved outer light cover has an outer major surface that is at least 50% retroreflective.

56. The lighting assembly of any of embodiments 1 to 52, wherein the outer light cover has an outer major surface that is at least 75% retroreflective.

57. The lighting assembly of any of embodiments 1 to 52, wherein the outer light cover has an outer major surface that is at least 90% retroreflective.

58. The lighting assembly of any preceding embodiment, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

59. The lighting assembly of any preceding embodiment, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

60. A sign comprising the light assembly of any preceding embodiment.

61. A backlight comprising the light assembly of any of embodiments 1 to 59.

62. A display comprising the light assembly of any of embodiments 1 to 59.

63. The light assembly of any of embodiments 1 to 59 which is a vehicle component.

64. The light assembly of any of embodiments 1 to 59 which is a vehicle tail light assembly.

65. A vehicle comprising the lighting assembly of any of embodiments 1 to 59.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A light assembly comprising
an outer light cover having a first and second generally opposed major surfaces, and a first zone having a first color, and a second zone having a second, at least one of different color or being clear, the second major surface being an inner major surface;
a reflector having an inner major surface that is parallel to at least 30 percent of the inner major surface of the outer light cover;
an inner lens disposed between the outer light cover and the reflector, the inner lens having first and second generally opposed major surfaces, wherein at least one of the first or second major surfaces of the inner lens is transflective, wherein the second major surface of the inner lens is closer to the inner major surface of the reflector than the first major surface of the inner lens; and
a first light source that emits a first color when energized; wherein there is an optical cavity between inner major surface of the inner lens and the inner major surface of the reflector, and wherein the first light source is selected and positioned to introduce light into the optical cavity such that, when energized, provides the same color for the first and second zones when viewed from the first major surface of the outer cover.

2. The lighting assembly of claim 1, wherein the outer light cover is curved.

3. The lighting assembly of either claim 1 or 2, wherein the first color of the first zone is red, with the first color of the first light source being red, the second color of the second zone is white or clear, with the second color of the second light source being correspondingly white or clear, and the third color of the third zone is amber, with the third color of the third light source being amber.

4. The lighting assembly of claim 1, further comprising a second light source that emits a second color when energized, different than the first color of the first light source, wherein the second light source is selected and positioned to introduce light into the optical cavity such that, when energized, provides the same color for the first zone when viewed from the first major surface of the outer cover.

5. The lighting assembly of claim 4, wherein the second light source is selected and positioned to introduce light into the optical cavity such that, when energized, also provides the second color for the second zone when viewed from the first major surface of the outer cover.

6. The lighting assembly of claim 4, wherein the first and second light sources are in a single optical cavity.

7. The lighting assembly of claim 4, further comprising a third light source that emits a third color when energized, is the same as the first light source when energized, but brighter, than the first color of the first light source, wherein the third light source is selected and positioned to introduce light into the optical cavity such that, when energized, provides a light intensity brighter than the intensity of the first light source when viewed from the first major surface of the outer cover.

8. The lighting assembly of claim 4, further comprising a fourth light source that emits a fourth color when energized, different than both the first color of the first light source and the second color of the second light source, wherein the fourth light source is selected and positioned to introduce light into the optical cavity such that, when energized, provides a color different from the first and second light sources when viewed from the first major surface of the outer cover.

9. The lighting assembly of claim 1, wherein the inner major surface of the curved outer light cover is generally convex relative to the reflector.

10. The light assembly of claim 1 having a length to depth ratio greater than 2:1.

11. The lighting assembly of claim 1, wherein the transflective surface is a film having a transflective surface, the transflective surface is molded into the inner major surface of the outer light cover, or the transflective surface is embossed into inner surface of the outer light cover.

12. The lighting assembly of claim 1, wherein the first and second light sources are each light emitting diodes.

13. The light assembly of claim 1 which is a vehicle tail light assembly.

14. The light assembly of claim 2, wherein the first color of the first zone is red, with the first color of the first light source being red, the second color of the second zone is white or clear, with the second color of the second light source being correspondingly white or clear, and the third color of the third zone is amber, with the third color of the third light source being amber.

15. The light assembly of claim 1, wherein the transflective surface has a structure comprised of a plurality of shapes having a height to base length ratio greater than 0.6:1.

16. The light assembly of claim 11, wherein the transflective surface has a structure comprised of a plurality of shapes having a height to base length ratio greater than 0.6:1.

17. The light assembly of claim 13, wherein the transflective surface has a structure comprised of a plurality of shapes having a height to base length ratio greater than 0.6:1.

18. The light assembly of claim 1, having a length to depth ratio greater than 3:1.

19. The light assembly of claim 1, having a length to depth ratio greater than 5:1.

20. The light assembly of claim 1, having a length to depth ratio greater than 10:1.

* * * * *

UNITED STATES PATENT AND TRADEMARK OFFICE
CERTIFICATE OF CORRECTION

PATENT NO. : 9,151,460 B2  
APPLICATION NO. : 13/384939  
DATED : October 6, 2015  
INVENTOR(S) : Timothy Stagg Page 1 of 1

It is certified that error appears in the above-identified patent and that said Letters Patent is hereby corrected as shown below:

Specification

<u>Column 1</u>
Line 7, delete "PCT/US2011/011377," and insert -- PCT/US2010/042548, --

<u>Column 7</u>
Line 8, delete "2007," and insert -- 2007 (Attorney Docket No. 63031US002), --

Line 9, delete "US2008/064133," and insert -- US2008/064133 (Attorney Docket No. 63274WO004), --

<u>Column 9</u>
Line 47, delete "Cone2h186" and insert -- Cone2h1 85 --

Line 50, delete "Pyr2h188" and insert -- Pyr2h1 88 --

<u>Column 10</u>
Line 50, delete "US2008/864115," and insert -- US2008/864115 (Attorney Docket No. 63032WO003), --

Claims

<u>Column 20</u>
Line 47, in claim 3, delete "either claim 1 or 2" and insert -- claim 1, --

Signed and Sealed this  
Twenty-second Day of March, 2016

Michelle K. Lee  
*Director of the United States Patent and Trademark Office*